United States Patent
Haunsoe et al.

(10) Patent No.: US 10,178,511 B2
(45) Date of Patent: Jan. 8, 2019

(54) VESSEL TRAFFIC MANAGEMENT SYSTEM

(71) Applicant: Marcura Equities FZE, Dubai (AE)

(72) Inventors: Christian Siemers Haunsoe, Carabietta (CH); Aleksandrs Tarasenko, Dubai (AE)

(73) Assignee: Marcura Equities FZE, Dubai (AE)

( * ) Notice: Subject to any disclaimer, the term of this patent is extended or adjusted under 35 U.S.C. 154(b) by 61 days.

(21) Appl. No.: 15/135,426

(22) Filed: Apr. 21, 2016

(65) Prior Publication Data
US 2017/0309188 A1 Oct. 26, 2017

(51) Int. Cl.
| | |
|---|---|
| G06Q 10/06 | (2012.01) |
| G06Q 10/08 | (2012.01) |
| G06Q 50/28 | (2012.01) |
| G08G 3/00 | (2006.01) |
| H04L 29/08 | (2006.01) |
| H04W 4/02 | (2018.01) |
| H04W 4/46 | (2018.01) |
| H04W 4/04 | (2009.01) |
| H04W 4/021 | (2018.01) |
| G08G 3/02 | (2006.01) |

(52) U.S. Cl.
CPC ........ *H04W 4/046* (2013.01); *G06Q 10/0639* (2013.01); *G06Q 10/083* (2013.01); *G06Q 50/28* (2013.01); *G08G 3/02* (2013.01); *H04L 67/12* (2013.01); *H04W 4/021* (2013.01)

(58) Field of Classification Search
CPC ........ G08G 3/00; H04W 4/046; H04W 4/021; G06Q 50/28; G06Q 10/0639; G06Q 10/083; H04L 67/12
See application file for complete search history.

(56) References Cited

U.S. PATENT DOCUMENTS

| | | | |
|---|---|---|---|
| 4,014,004 A | * 3/1977 | Fuller | G08G 3/00 340/10.41 |
| 8,935,174 B2 | 1/2015 | Chen et al. | |
| 9,384,456 B2 | 7/2016 | Borgerson | |
| 9,798,996 B2 | 10/2017 | Borgerson | |

(Continued)

FOREIGN PATENT DOCUMENTS

WO  2009158445 A3  12/2009

OTHER PUBLICATIONS

Chen, Longbiao, et al. "Container port performance measurement and comparison leveraging ship GPS traces and maritime open data." IEEE Transactions on Intelligent Transportation Systems17.5 (2015): 1227-1242. (Year: 2015).*

(Continued)

*Primary Examiner* — Alan D Hutchinson
(74) *Attorney, Agent, or Firm* — Peter Tormey; Antero, Tormey & Petrin, PC

(57) ABSTRACT

A method including receiving, at a server, vessel AIS information, said AIS information including at least a vessel identifier and a vessel location. Querying a location data store in response to the vessel location, said location data store including port location information. Determining, in response to said querying, whether the vessel is in a port area or port approach area and iteratively receiving, additional AIS information which may be stored as structured data. And calculating port performance metrics in response to the location information, and transmitting those performance metrics through a network.

19 Claims, 5 Drawing Sheets

(56) References Cited

U.S. PATENT DOCUMENTS

| | | | | |
|---|---|---|---|---|
| 2009/0271054 A1* | 10/2009 | Dokken | ............... | G01S 13/9307 |
| | | | | 701/21 |
| 2011/0257819 A1* | 10/2011 | Chen | ..................... | G01S 5/0027 |
| | | | | 701/21 |
| 2015/0134558 A1* | 5/2015 | Murray | ............... | G06Q 10/0833 |
| | | | | 705/333 |

OTHER PUBLICATIONS

Chen, Longbiao, et al. "Container throughput estimation leveraging ship GPS traces and open data." Proceedings of the 2014 ACM International Joint Conference on Pervasive and Ubiquitous Computing. ACM, 2014. (Year: 2014).*
Wikipedia, XML, printed 2017 (Year: 1997).*
Wikipedia, Virtual Machine, printed 2017 (Year: 1966).*
Wikipedia, Automatic Identification System, Apr. 19, 2016 (Year: 2016).*

* cited by examiner

VESSEL TRAFFIC MANAGEMENT SYSTEM

BACKGROUND

Navigating, transporting, managing, predicting and coordinating ocean vessel traffic is an age old problem faced by the maritime industry for centuries. The maritime Automatic Information System (AIS) provides some information to address these problems. The Automatic Identification System (AIS) is an automatic tracking system used on ships and by vessel traffic services (VTS) for identifying and locating vessels by electronically exchanging data with other nearby ships, AIS base stations, and satellites. When satellites are used to detect AIS signatures then the term Satellite-AIS (S-AIS) is often used. AIS information supplements marine radar, which continues to be the primary method of collision avoidance for water transport.

Information provided by AIS equipment, such as unique identification, position, course and speed, can be displayed on a screen or networked device. AIS is intended to assist a vessel's watchstanding officers and allow maritime authorities to track and monitor vessel movements. Conventionally, AIS integrates a standardized VHF transceiver with a positioning system such as a GPS receiver, with other electronic navigation sensors, such as a gyrocompass or rate of turn indicator. Vessels fitted with AIS transceivers can be tracked by AIS base stations located along coast lines or, when out of range of terrestrial networks, through a growing number of satellites that are fitted with special AIS receivers which are capable of de-conflicting a large number of signatures. The base stations and satellites are coupled to networks for providing the AIS information to remote users.

The International Maritime Organization's International Convention for the Safety of Life at Sea requires AIS to be fitted aboard international voyaging ships with gross tonnage (GT) of 300 or more, and all passenger ships regardless of size. Accordingly, AIS is widely used in marine transportation systems.

While AIS information is becoming widely available, there is a need to extract meaningful data from this information for efficient operation of marine transportation systems. Moreover, there is a need to couple the AIS information with other transportation and port information to efficiently schedule and price transportation requirements. For example, and without limitation, this need is apparent in the transport of perishable products. To arrange for transport of ripe (or nearly ripe) fruit to several ports requires more information than the typical operating speed of the transport vessel, but also knowledge of how much time will be required in each port of entry, because the fruit will spoil before it reaches the last port.

Additionally, loading and unloading times may be fairly well estimated, however, there may be wide variations in port operation times depending on terminal equipment, seasonality, port, berth and terminal utilization rates, as well as port operation characteristics and other conditions in the port area that affect the operation of those ports.

In view of the foregoing, reliable quantification, estimation and scheduling are needed to maximize overall transport efficiency.

DESCRIPTION

Generality of Invention

Figure 1:
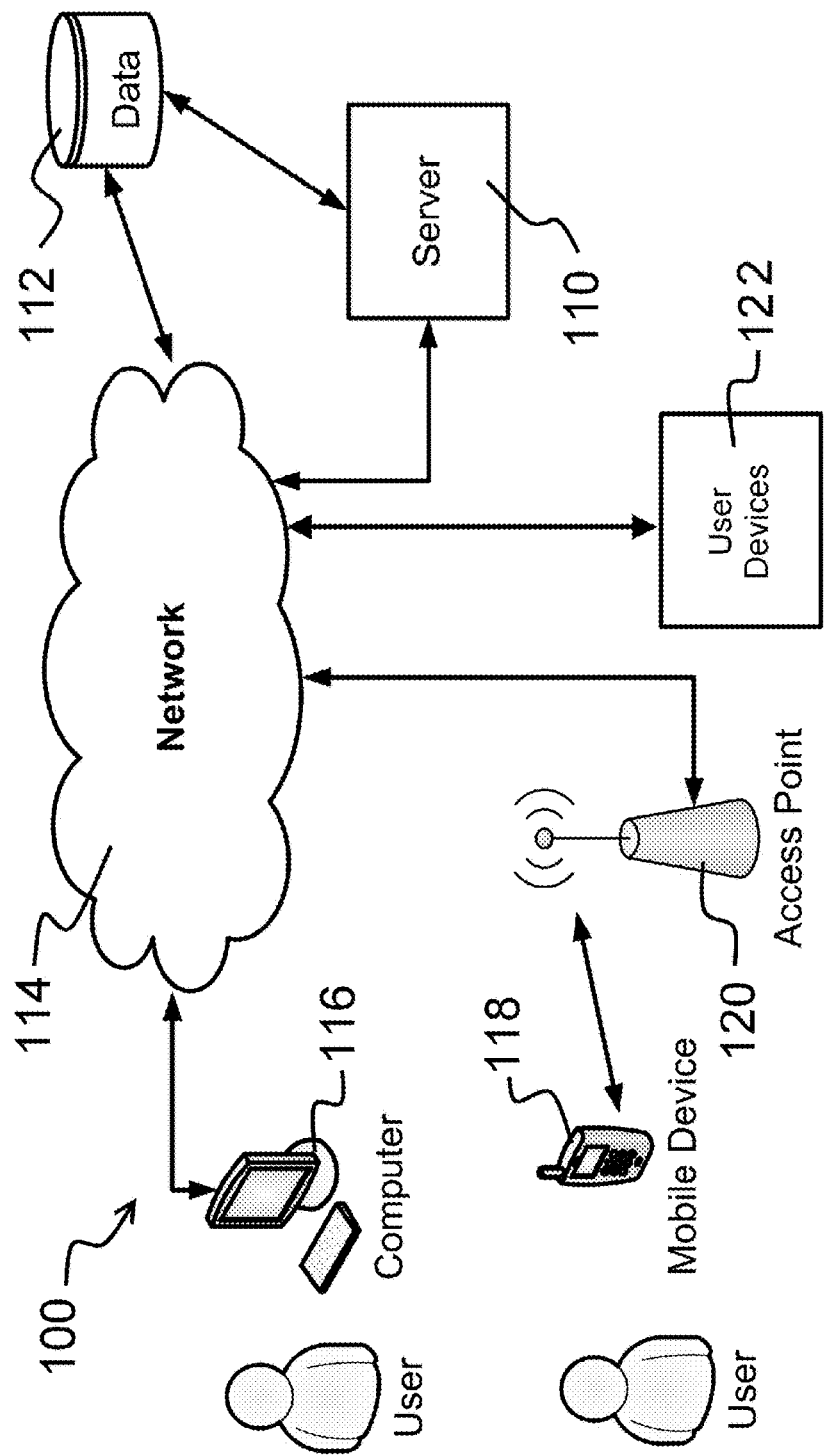
FIG. 1 shows a functional block diagram of a client server system.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The terms "structured data" and "structured data source" generally means a coherent way to save and access information such as in a database, XML file and the like.

The term "virtual machine" or "VM" generally refers to a self-contained operating environment that behaves as if it is a single computer even though it is part of a separate computer or may be virtualized using resources from multiple computers.

The acronym "XML" generally refers to the Extensible Markup Language. It is a general-purpose specification for creating custom markup languages. It is classified as an extensible language because it allows its users to define their own elements. Its primary purpose is to help information systems share structured data, particularly via the Internet, and it is used both to encode documents and to serialize data.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Processing System

The methods and techniques described herein may be performed on a processor based device. The processor-based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover any device or system that operates to effectuate techniques according to the current disclosure may be considered a server for the purposes of this disclosure if the device or system operates to communicate all or a portion of the operations to another device.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality. Alternatively, the entire processing system may be self-contained on a single device or effectuated remotely as a virtual machine.

Client-Server Processing

FIG. 1 shows a functional block diagram of a client server system 100 that may be employed for some embodiments according to the current disclosure. In the FIG. 1, a server 110 is coupled to one or more databases 112 and to a network 114. The network may include routers, hubs and other equipment to effectuate communications between all associated devices. A user accesses the server by a computer 116 communicably coupled to the network 114. The computer 116 includes a sound capture device such as a microphone (not shown). Alternatively, the user may access the server 110 through the network 114 by using a smart device such as a telephone or PDA 118. The smart device 118 may connect to the server 110 through an access point 120 coupled to the network 114. The mobile device 118 includes a sound capture device such as a microphone.

Conventionally, client-server processing operates by dividing the processing between two devices such as a server and a smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine readable instructions are conventionally known including applets and are written in a variety of languages including Java and JavaScript.

Client-server applications also provide for software-as-a-service (SaaS) applications where the server provides software to the client on an as-needed basis.

In addition to the transmission of instructions, client-server applications also include transmission of data between the client and server. Often, this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus, data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein, a display engine, a data engine, an execution engine, a user interface (UI) engine, and the like may be employed. These engines may seek and gather information about events from remote data sources.

In this disclosure, the above described systems also include radio and satellite transmission systems as well as AIS information collection devices and the associated networks employed in the aforementioned AIS systems.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

As used herein, certain phrases and words are added to messages indicating vessel operations or vessel status. These term indications include, but are not limited to "Moving", "At Berth", "In PAA", and the like. These terms are merely exemplary and other terms having similar meanings for vessel status are contemplated as within the scope of the current disclosure. Moreover, one having skill in the art will appreciate that the exact phraseology as used herein is not required to effect the full scope of this disclosure, even though the terms presented herein are used conventionally.

In addition, the information, including AIS messages, may be stored in a structured data store for sourcing the data when needed. This may include a series of discrete messages or data, or may involve a larger aggregated message including information from multiple messages, including those message appended as described herein. Accordingly, method steps that call for adding information, such as status, to a message, may be effectuated by adding a record to a structured data store associated with a particular ship or vessel or modifying an existing record to include additional information.

Port Approach

Figure 2:
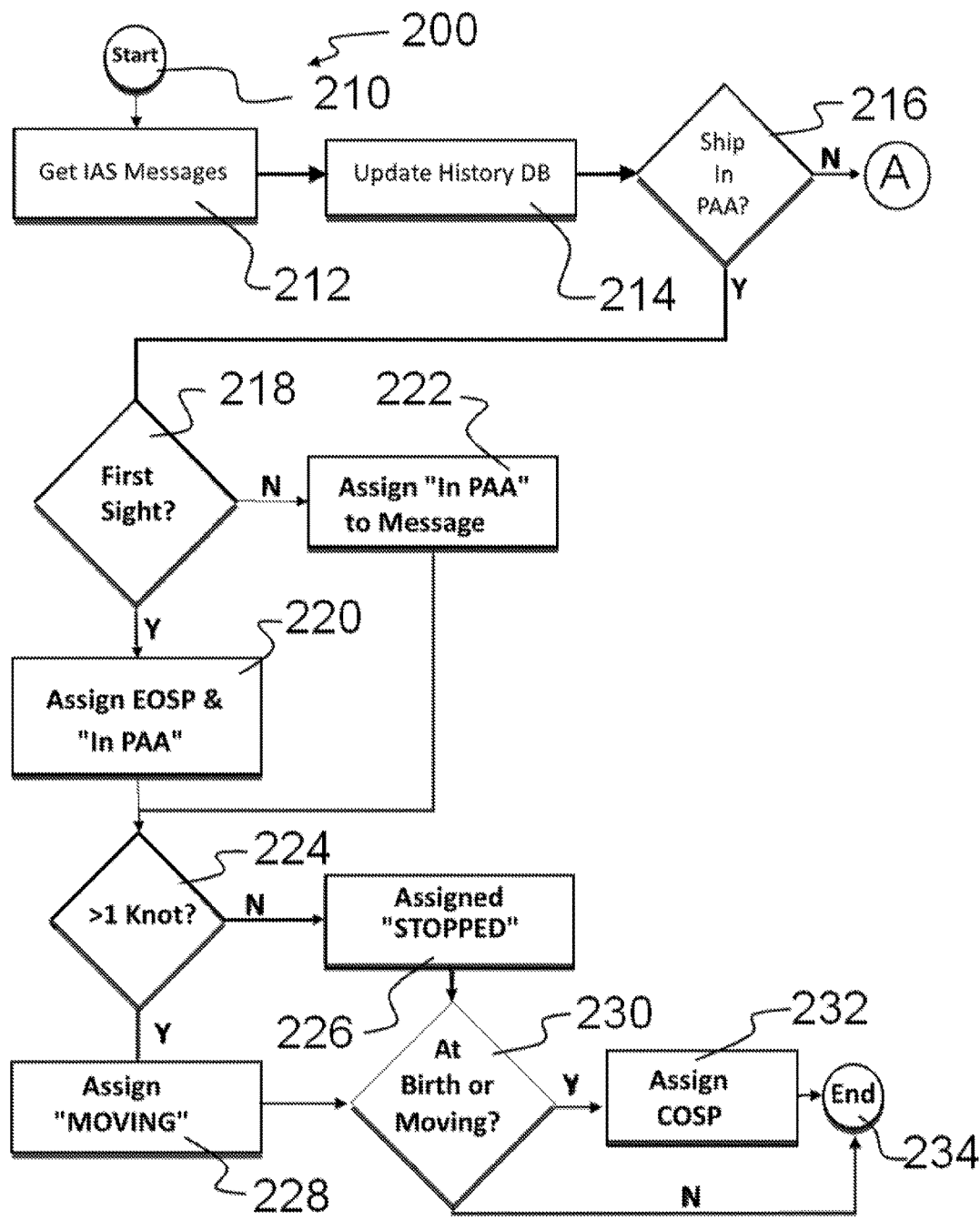
FIG. 2 shows a flowchart of a portion of a method which may be employed according to the current disclosure.

FIG. 2 illustrates a flowchart for a portion of a method 200 for use in certain embodiments according to the current disclosure. The method begins at a flow label 210.

At a step 212, the method step includes acquiring AIS data which may be acquired through a conventional network. The AIS data may be acquired at a network terminal or server or wirelessly. AIS data may arrive as a message and include, but is not limited to, one or more of the following:

- The vessel's Maritime Mobile Service Identity (MMSI)—conventionally, a unique nine-digit identification number;
- Navigation status—"at anchor", "under way using engine(s)", "not under command", etc.;
- Rate of turn—right or left, from 0 to 720 degrees per minute;
- Speed over ground—0.1-knot (0.19 km/h) resolution from 0 to 102 knots (189 km/h);
- Positional accuracy (longitude and latitude);
- Course over ground—relative to true north to 0.1°;
- True heading—0 to 359 degrees (for example, from a gyro compass);
- True bearing at own position—0 to 359 degrees;
- UTC Seconds—The seconds field of the UTC time when these data were generated (a complete timestamp may not be present);
- IMO ship identification number—a seven-digit number that remains unchanged upon transfer of the ship's registration to another country;
- Radio call sign—international radio call sign, up to seven characters, assigned to the vessel by its country of registry;
- Name—20 characters to represent the name of the vessel;
- Type of ship/cargo;
- Dimensions of ship;
- Location of positioning system's antenna on board the vessel—in meters aft of bow and meters port or starboard;
- Type of positioning system—such as GPS, DGPS or LORAN-C and the like;
- Draught of ship;
- Destination—max. 20 characters; or
- ETA (estimated time of arrival) at destination in UTC.

In addition to AIS data, proprietary data may also be included in certain embodiments.

Location Information

At a step 214, a ship's history database is updated with the AIS data. The ship's history may be in a locally or remotely structured data source. The ship's history database may include previous messages including AIS information from various ships.

At a step 216, the AIS information is used to determine if a vessel is in a port approach area (PAA). A PAA may be determined by comparing location information from the AIS message to a location master database. The locations master database may include, but is not limited to, one or more of the following:

- Country;
- Port;
- Port approaches;
- Anchorages;
- Berths;
- Terminals;
- Transfer Zones;
- Transit ways; or
- Polygons.

As used herein, transit ways and polygons and other information included in the master location database identify areas associated with maritime transportation. PAAs are specific to ports and may be defined by local port authorities or harbormasters for communication to maritime vessels. PAAs generally define defines channels or pathways for vessels to enter and leave ports.

If the vessel is not in a PAA flow transfers to flow connector A for processing described below. If the vessel is in a PAA, the method continues to a step 218.

At a step 218, the ships history is compared with the most recent message to determine if it is the first indication that the vessel is in the PAA. If yes, the method proceeds to a step 220. If not, the flow moves to a step 222.

At a step 222, the phrase "in PAA" is assigned to the message and flow moves to a step 224.

At a step 220, the phrases "End of sea passage" (or EOSP) and "In PAA" are assigned to the message and flow moves to a step 224.

At a step 224, the AIS message is tested to determine if the ship is moving at a predetermined velocity (1 knot is shown by way of example). If the ship is moving at greater than the predetermined velocity, the method moves to a step 228; if not the method moves to a step 226.

At a step 226, the message has "Stopped", or some other similar indicia attached to it and the method moves to a step 230.

At a step 228, the message has "Moving" or some other indicia of motion assigned to it and proceeds to a step 230.

At a step 230, a prior message from the ship is tested to see if it indicated either "At Berth" or "Moving Out." If not, then the method ends at a flow label 234. If yes, then the method moves to a step 232.

At a step 232, the term "Commencement of Sea Passage" (or COSP) is added to the message and the method ends at a flow label 234.

Figure 3:
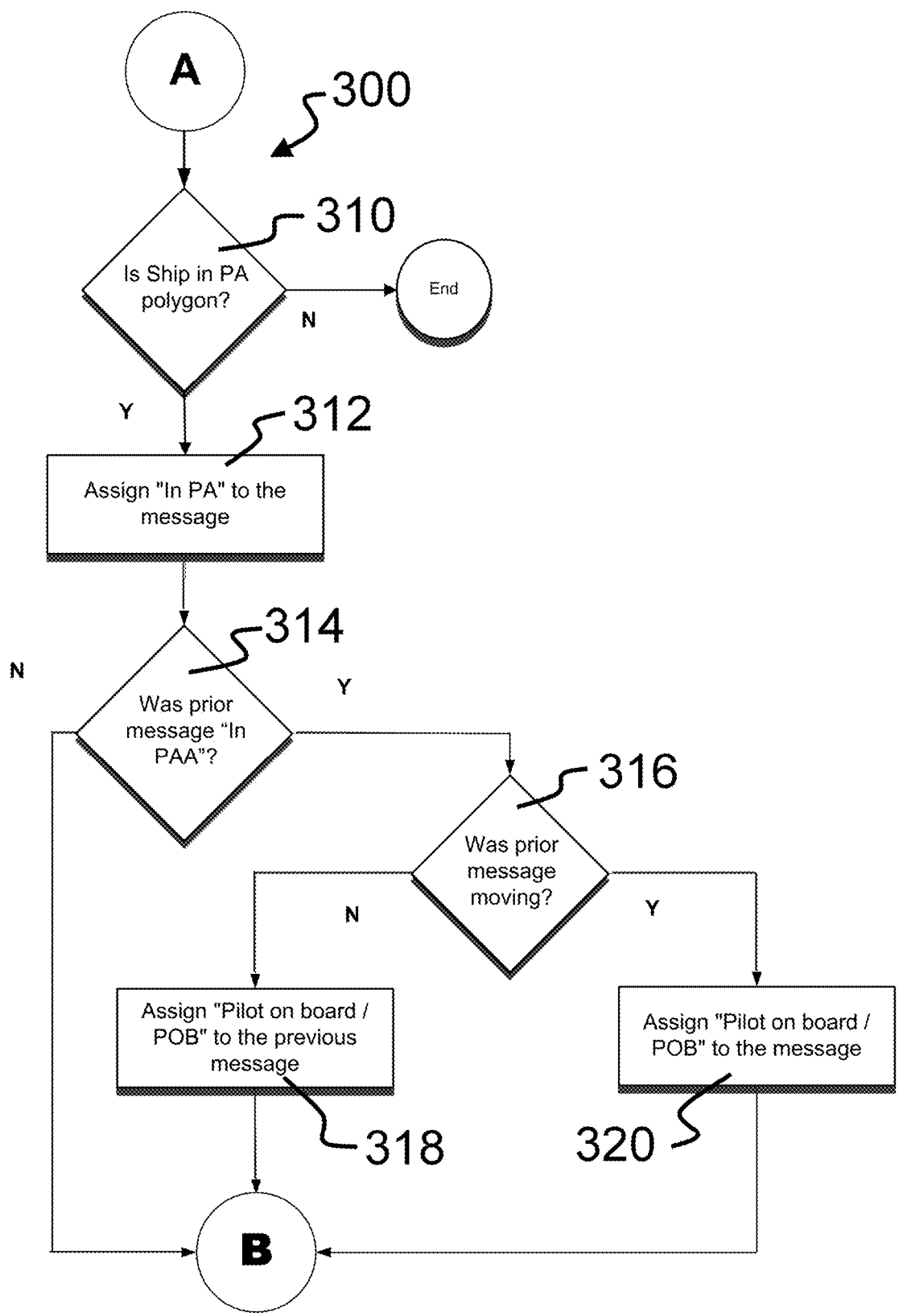
FIG. 3 shows a flowchart of a portion of method steps that may be employed according to the present disclosure.

FIG. 3 shows a flowchart of a portion of a method 300 that may be employed according to the present disclosure.

The method of FIG. 3 begins at a flow label A.

At a step 310, the vessel's location is analyzed to determine if it is in a port area polygon. If it is not, the method ends. If it is, then the method proceeds to a step 312.

At a step 312, "In PA" is assigned to the message and recorded.

At a step 314, the prior message is analyzed to determine if it indicated the vessel was in the port approach area. If not, the method proceeds to a flow label B. If yes, the method proceeds to a step 316.

At a step 316, the prior message is analyzed to determine if it indicated the vessel was moving. If yes, then at a step 320 "Pilot on Board" (POB) is assigned to the message. If not, then at a step 318 "Pilot on Board" is assigned to the previous message.

The method proceeds to a flow connector B.

Figure 4:
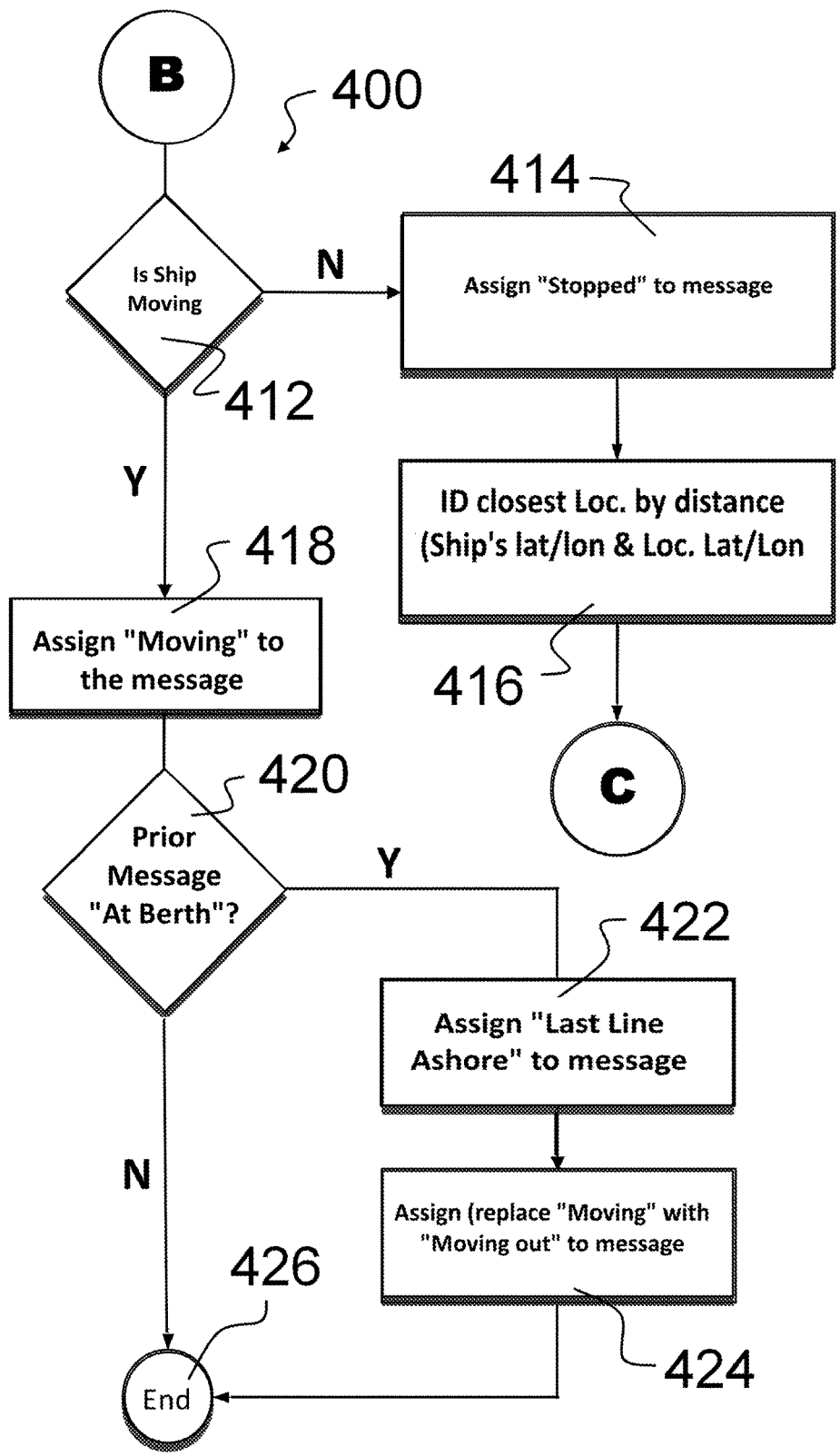
FIG. 4 shows a flowchart of a portion of a method 400 according to the present disclosure.

FIG. 4 shows a flowchart of a portion of a method 400 according to the present disclosure. Starting from the connector label B, the method proceeds to a step 412.

At a step 412, the AIS message is analyzed to determine if the ship is moving. Movement may be ascertained by comparing the overall velocity to discriminate from system noise which may present itself as random movement. If the ship is not moving, the message proceeds to a step 414. If it is moving, the method proceeds to a step 418.

At a step 414, "Stopped" is assigned to the message and the method proceeds to a step 416 where the closest location is identified. Identifying the closest location may involve querying the Location database and comparing it to the ship's latitude and longitude information. The method then proceeds to a connector C.

Continuing at a step 418, "Moving" is assigned to the message and the method proceeds to a step 420.

At a step 420, the prior message is analyzed to see if it includes "At Berth"; if not, the method ends at a flow label 426. If yes, then the method proceeds to a step 422.

At a step 422, "Last Line Ashore" is assigned to the message and flow proceeds to a step 424.

At a step 424, the message is changed to replace "Moving" with "Moving Out" and the method ends at a flow label 426.

Figure 5:
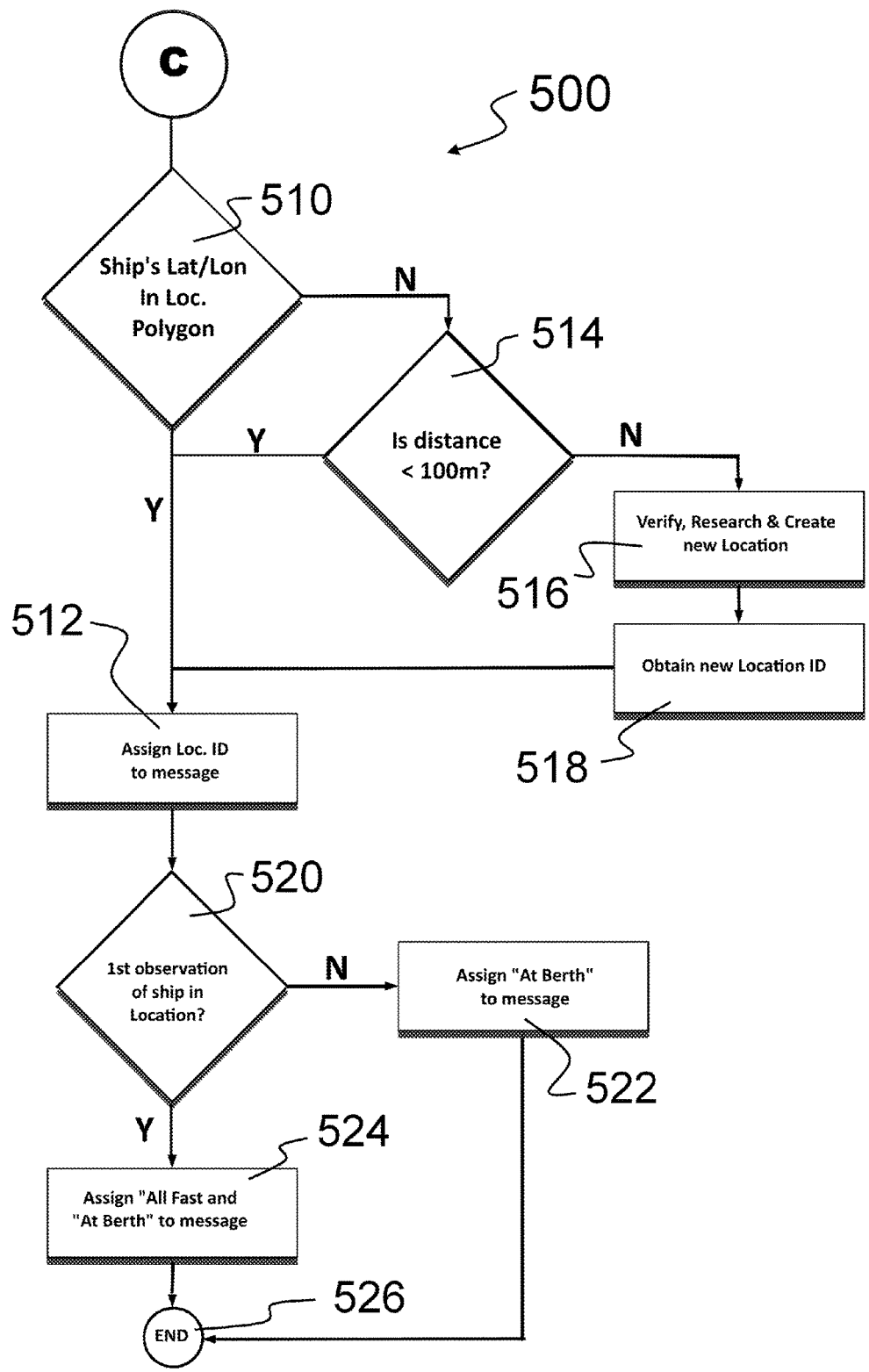
FIG. 5 shows a portion of a method which may be used according to the present disclosure.

FIG. 5 shows a portion of a method which may be used according to the present disclosure.

The method begins at a connector label C. At a step 510, the ship's latitude and longitude are analyzed to determine if the ship is in the Location polygon. If yes, the method proceeds to a step 512. If not, the method proceeds to a step 514.

At a step 514, the distance between the ship and the Location is analyzed to see if it is within a predetermined distance (100 m is shown). If yes, the method proceeds to a step 512. If not, the Location is verified, researched and new location information is generated. The method then proceeds to a step 518.

At a step 518, a new location identifier is obtained and stored in the Location data store with location information. The method then proceeds to a step 512.

At a step 512, the Location ID is assigned to the message.

At a step 520, the ship's history is analyzed to determine if this is the first observation of the ship in the location. If not, then method proceeds to a step 522. If yes, the method proceeds to a step 524.

At a step 522, "At Berth" is assigned to the message and the method ends at a flow label 526.

At a step 524, "ALL FAST" and "At Berth" are assigned to the message and the method ends at a flow label 526.

Operations

In some embodiments, a method may be performed that calculates delays at specific terminals and berths within a port area. To effectuate this method, a processor, such as a networked server, would receive AIS updates at regular intervals. AIS updates may be received as a result of a ship's history database. From these updates, the following steps may be applied:

Capturing the time stamp of the AIS signal when the vessel crosses an anchorage, pilot boarding area, or a predefined geo-fenced coordinate area (which may be a polygon). This time may be defined as "AIS—End of Sea Passage."

Capturing the time stamp of the AIS signal when the vessel exits an anchorage, pilot boarding area or predefined geo-fenced area after "AIS-End of Sea Passage." This time may be defined as "AIS—Pilot on Board."

Capturing the time stamp of the AIS signal when the vessel arrives alongside a terminal and/or berth within a port area after "AIS-Pilot on Board" is established. This time may be defined as "AIS—All Fast."

Capturing the time stamp of the AIS signal when the vessel departs a terminal and/or berth within a port area after "AIS-All Fast" is established. This time may be defined as "AIS—Last Line."

Once these measurements are received, a wait time may be calculated for each vessel. This may entail the following:

Each vessel at every port of call to be assigned a unique virtual port call identification number (VPC).

Each VPC will be assigned to a terminal as defined by the "AIS—All Fast" calculation or equivalent thereof.

The time difference between "AIS—End of Sea passage" and "AIS—All Fast" may be recorded as "Waiting Time" for the VPC.

This VPC may change if vessel returns to the anchorage area and re-enters the port.

This disclosure may also calculate the waiting time for the terminals at a port. To effectuate this calculation, the following steps may be employed:

An aggregate of VPC waiting times for each terminal may be used to calculate the average waiting time for the vessel to berth.

The number of VPCs used to calculate may be determined by the end user, or be based upon industry standards.

A method may also be used to calculate the "time alongside" for each vessel in a berth, as follows:

Each vessel at every port of call to be assigned a unique virtual port call identification number (VPC).

Each VPC may be assigned to a terminal as defined by the "AIS—All Fast" calculation.

The time difference between "AIS—All Fast" and "AIS—Last Line" may be recorded as "Time Alongside" for the VPC.

This VPC may change if vessel returns to the anchorage area and re-enters the port.

Once the abovementioned information is collected and the relevant calculations performed, terminal and berth utilization statistics may be developed as follows:

Time stamps for each VPC alongside may be made.

Times when there is no vessel alongside may be determined.

The percentage of time that a vessel is alongside a terminal and/or berth may be calculated as the terminal utilization rate.

The terminal utilization rates may be aggregated to form port utilization rate, which may be quantified for certain dates or date ranges.

In additional to berth and terminal information, additional information may be related to the type of cargo or type of vessel serviced at a particular port. For example and without limitation, a user may identify two equally-capable ports located relatively close together, and direct cargo to the most efficient port. Or a user may schedule port calls with respect to operating efficiency for the type of vessel, so that perishable products are properly laded.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A method for maritime vessel data processing including:
   receiving at a server, a first AIS information indicative of a vessel identifier and location, said server coupled to a network;
   querying a structured data source in response to said first AIS information, said data source including predetermined geographic information;
   determining, as a result of said querying, vessel related operating information related to the geographic information;
   altering the first AIS information to include an indicia of the results of said determining;
   storing the AIS information and the indicia information in a structured data store, and
   calculating, using the stored AIS information and indicia, port call performance metrics.

2. The method of claim 1:
   wherein the indicia includes at least one of either pilot on board or port approach area.

3. The method of claim 1 wherein said network is the Internet and the structured data is XML formatted.

4. The method of claim 1 wherein said determining includes comparing the AIS information to at least one of a predetermined anchorage, pilot boarding area, or a predefined geo-fenced coordinate area.

5. The method of claim 1 wherein said server is a virtual machine.

6. The method of claim 1 wherein said AIS information includes at least one of a vessel type, a port location, or a vessel velocity.

7. The method of claim 6 further including:
   calculating at least one of an average wait time for a port, or an average wait time for a berth, in response to the vessel type.

8. A method including:
   receiving, at a server, vessel AIS information, said AIS information including at least a vessel identifier and a vessel location;
   querying a location data store in response to the vessel location, said location data store including a predetermined port location information;
   determining, in response to said querying, whether the vessel is in a port approach area;
   receiving, in response to said determining, a second AIS information;
   storing, as structured data, location information for the vessel in response to the second AIS information, said location information indicative of locations in the port;
   calculating port performance metrics in response to the location information, and
   transmitting the performance metrics through a network.

9. The method of claim 8 wherein said network is the Internet.

10. The method of claim 8 wherein said structured data is XML formatted.

11. The method of claim 8 wherein said server is a virtual machine.

12. The method of claim 8 wherein said port approach areas includes transit ways and polygons, said transit ways and polygons unique to each port.

13. The method of claim 8 wherein said determining includes comparing the AIS information to at least one of a predetermined anchorage, pilot boarding area, or a predefined geo-fenced coordinate area.

14. The method of claim 8 wherein said port performance metrics include at least one of average time to berth, time alongside berth, berth utilization rate, or terminal utilization rate.

15. The method of claim 8 wherein said storing, as structured data, location information for the vessel includes adding status information to the AIS message.

16. A processor readable storage device having processor readable, non-transitory, code embodied on said processor readable storage device, said code for programming one or more processors to perform a method including:
   receiving, vessel AIS information, said AIS information including at least a vessel identifier and a vessel location;
   querying a location data store in response to the vessel location, said location data store including a predetermined port location information;
   determining, in response to said querying, whether the vessel is in a port approach area;
   receiving, in response to said determining, a second AIS information;
   storing, as structured data, location information for the vessel in response to the second AIS information, said location information indicative of locations in the port;
   calculating port performance metrics in response to the location information, and
   transmitting the performance metrics through a network.

17. The device of claim 16 wherein said determining includes comparing the AIS information to at least one of a predetermined anchorage, pilot boarding area, or a predefined geo-fenced coordinate area.

18. The device of claim 16 wherein said port performance metrics include at least one of average time to berth, time alongside berth, berth utilization rate, or terminal utilization rate.

19. The device of claim 16 wherein said storing, as structured data, location information for the vessel includes adding status information to the AIS message.

* * * * *